(12) United States Patent
Leopardi et al.

(10) Patent No.: US 9,652,429 B2
(45) Date of Patent: May 16, 2017

(54) HORIZONTALLY EXPANDABLE COMPUTING SYSTEM

(71) Applicant: Onulas, LLC, Fort Lauderdale, FL (US)

(72) Inventors: Emmett Jay Leopardi, Wilton Manors, FL (US); Walter Riley Thurmond, III, Maple Valley, WA (US); Carl R. Harte, Tamarac, FL (US)

(73) Assignee: ONULAS, LLC, Fort Lauderdale, FL (US)

( * ) Notice: Subject to any disclaimer, the term of this patent is extended or adjusted under 35 U.S.C. 154(b) by 0 days.

(21) Appl. No.: 14/855,740

(22) Filed: Sep. 16, 2015

(65) Prior Publication Data
US 2017/0075848 A1 Mar. 16, 2017

(51) Int. Cl.
*G06F 13/40* (2006.01)
*G06F 13/42* (2006.01)
*G06F 9/44* (2006.01)

(52) U.S. Cl.
CPC ........ *G06F 13/4068* (2013.01); *G06F 9/4401* (2013.01); *G06F 13/4022* (2013.01); *G06F 13/426* (2013.01)

(58) Field of Classification Search
CPC ....... G02B 6/43; G02B 6/3897; H04B 10/801
See application file for complete search history.

(56) References Cited

U.S. PATENT DOCUMENTS

| | | | | | |
|---|---|---|---|---|---|
| 4,943,136 | A | * | 7/1990 | Popoff | G02B 6/2804 385/46 |
| 5,793,919 | A | * | 8/1998 | Payne | G02B 6/2804 385/134 |
| 5,980,312 | A | * | 11/1999 | Chapman | G02B 6/3817 361/788 |
| 6,823,100 | B1 | * | 11/2004 | Roemerman | G02B 6/43 385/134 |
| 7,193,847 | B2 | * | 3/2007 | Liang | H05K 7/1445 16/229 |
| 7,376,295 | B2 | * | 5/2008 | Lee | G02B 6/12002 385/14 |
| 7,461,274 | B2 | * | 12/2008 | Merkin | G06F 1/206 713/300 |

(Continued)

OTHER PUBLICATIONS

"Development of Optical Interconnect PCBs for High-Speed Electronic Systems—Fabricators View"—2011 IBM Printect Circuit Board Symposium, 20 pages, Dated Nov. 16, 2011.*

(Continued)

*Primary Examiner* — Brian Misiura
(74) *Attorney, Agent, or Firm* — The Concept Law Group, P.A.; Scott D. Smiley; Yongae Jun (57) ABSTRACT

A server is disclosed having at least one processor, at least one primary memory, and at least one secondary memory. The server further includes a primary memory board disposed primarily to support the at least one primary memory; a secondary memory board disposed primarily to support the at least one secondary memory; and a processor board disposed primarily to support the at least one processor. An optical bus couples the primary memory board, the secondary memory board, and the processor board to each other to communicatively couple the at least one processor to the at least one primary memory and the at least one secondary memory.

20 Claims, 5 Drawing Sheets

(56) References Cited

U.S. PATENT DOCUMENTS

| | | | | |
|---|---|---|---|---|
| 7,645,075 B2* | 1/2010 | Sasaki | | G02B 6/3897 |
| | | | | 385/134 |
| 8,316,377 B2* | 11/2012 | Riley | | H04L 49/65 |
| | | | | 710/306 |
| 8,351,204 B2* | 1/2013 | Yeo | | G06F 1/20 |
| | | | | 165/80.2 |
| 8,478,099 B2* | 7/2013 | Rolston | | G02B 6/4452 |
| | | | | 385/135 |
| 8,482,925 B2* | 7/2013 | Yang | | G06F 1/183 |
| | | | | 248/295.11 |
| 8,645,545 B2* | 2/2014 | Ganapathi | | H04L 67/1029 |
| | | | | 709/226 |
| 8,705,911 B2* | 4/2014 | McLaren | | H04B 10/801 |
| | | | | 385/24 |
| 8,781,319 B2* | 7/2014 | Goldstein | | G02B 6/3512 |
| | | | | 385/15 |
| 8,954,698 B2* | 2/2015 | Schenfeld | | G06F 12/0292 |
| | | | | 711/147 |
| 8,966,195 B2* | 2/2015 | Chang | | G06F 9/45537 |
| | | | | 711/159 |
| 8,982,552 B2* | 3/2015 | Roesner | | G06F 13/14 |
| | | | | 165/104.33 |
| 9,176,544 B2* | 11/2015 | Meza | | G06F 1/184 |
| 9,201,837 B2* | 12/2015 | Egi | | G06F 15/17331 |
| 9,207,416 B2* | 12/2015 | Morris | | G02B 6/43 |
| 2014/0164669 A1* | 6/2014 | Coglitore | | G06F 13/4022 |
| | | | | 710/316 |
| 2014/0310370 A1* | 10/2014 | Hendel | | H04L 67/1097 |
| | | | | 709/212 |
| 2014/0328562 A1* | 11/2014 | Pitwon | | G02B 6/4293 |
| | | | | 385/89 |
| 2015/0089100 A1* | 3/2015 | Vijayrao | | G06F 15/167 |
| | | | | 710/260 |
| 2015/0301299 A1* | 10/2015 | Benner | | G02B 6/4472 |
| | | | | 385/135 |
| 2015/0334867 A1* | 11/2015 | Faw | | G06F 13/00 |
| | | | | 211/126.1 |
| 2015/0381426 A1* | 12/2015 | Roese | | H04L 41/0896 |
| | | | | 709/226 |

OTHER PUBLICATIONS

Lim, et al., "Disaggregated Memory for Expansion and Sharing in Blade Servers", ACM SIGARCH Computer Architecture News, vol. 37, No. 3, Dated Jun. 2009, 12 pages.*

InfiniBand Architecture Specification vol. 2, Release 1.2.1, Dated Oct. 2006, 834 Pages.*

Itoh, Hideo, "Optical Backplanes", National Institute of Advanced Industrial Science and Technology; 88 pages, Dated Mar. 13, 2014.*

Singer, et al. "Cost Analysis: Optical Vs. Copper Backplanes", OnBoard Technology Sep. 2005, 3 pages; Dated 2005.*

* cited by examiner

HORIZONTALLY EXPANDABLE COMPUTING SYSTEM

FIELD OF THE INVENTION

The present invention relates generally to cloud computing and, more particularly, relates to a server system with discrete removable/expandable arrays of a single class of components that communicate through a central high-speed bus with other discrete arrays of different classes of components.

BACKGROUND OF THE INVENTION

Figure 1:
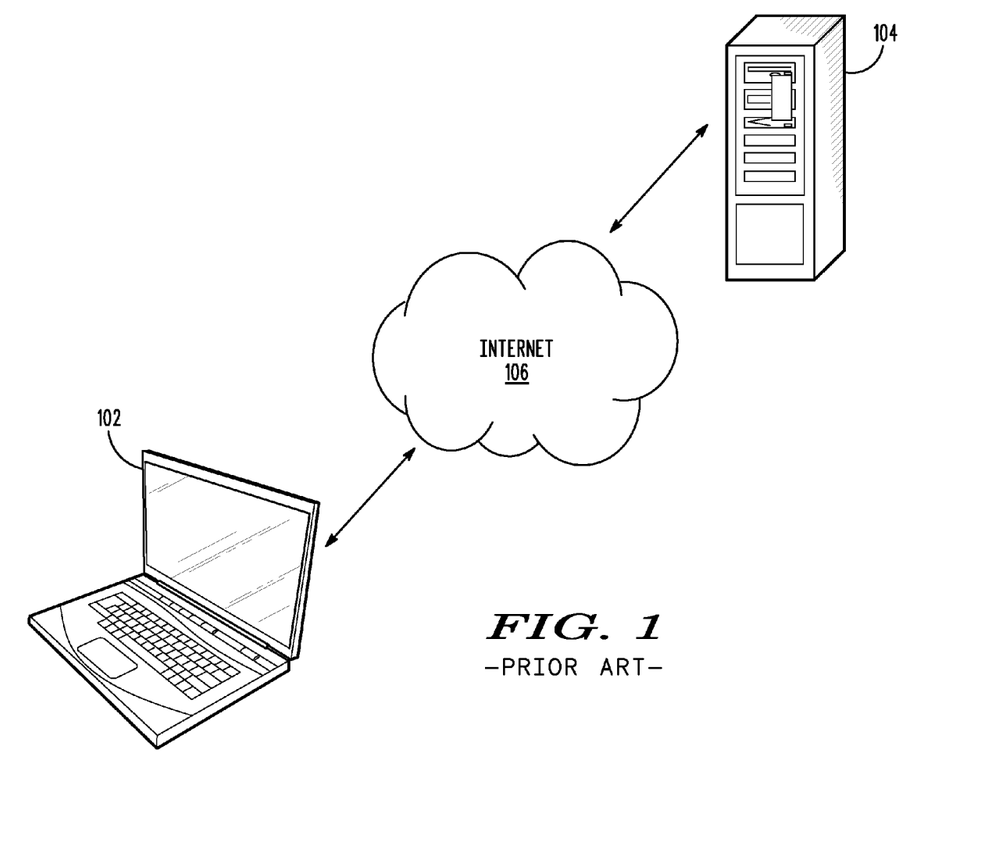
FIG. 1 is a block diagram of an exemplary distributed data processing network with a server and a client machine.

"Server," in the computing/information technology industry, is a term used quite broadly, but typically refers to a physical computer as well as running instances of software, the software and hardware being capable of accepting requests from and serving "clients." More specifically, the server computer utilizes a "client-server" architecture and the server programs serve the requests of other programs, referred to as the clients. The clients may run on the same computer, but typically connect to the server through a network. One example of such a network is shown in FIG. 1. There, a client machine 102 is connected to a server machine 104 through a network 106, e.g., the Internet.

The general purpose of the server architecture is to share data, information or hardware, and software resources. Examples of computing servers are database servers, file servers, mail servers, print servers, web servers, gaming servers, application servers, and others. For example, the client device 102 in FIG. 1 could be a machine running a web browser. The browser on the client device 102 connects to the server machine 104 and requests a particular webpage stored on that server. The server machine 104 then responds by sending back, via the network 106, a representation of that page, which the client machine 102 then displays to the user of that machine.

Hardware requirements for servers vary widely, depending on the server application. Generally, however, server machines are always on and always available to the clients without interruption, making durability, reliability, and fault tolerance important considerations when selecting components and architecture. Hardware redundancy, such as dual power supplies and RAID disk system ECC memory, along with extensive pre-boot memory testing and verification, are frequently utilized to ensure maximum uptime for the server devices. Central processing units (CPUs) with multiple processors provide these servers the ability to easily run complex tasks.

Server rooms, called data centers, frequently hold large numbers of server computers that are coupled together ("clustered") to provide redundancy in function and hardware. The server casings are usually flat, wide, and sized to be rack-mounted.

To handle the service requests from clients, network administrators typically dedicate each server to a specific application or processing task. One reason for this is that each task is not necessarily compatible with other tasks, making having a dedicated machine a convenient way to avoid conflicts. In addition, it is easy to track down problems as they arise when a machine performs only one task. Ifs a simple way to streamline a computer network from a technical standpoint.

One main issue with this one task/one machine arrangement is that it doesn't take full advantage of the server computers' processing power. In fact, under this architecture, the server might use only a small fraction of its overall processing capabilities. Another problem is that as a computer network gets larger and more complex, the servers begin to take up a lot of physical space. A data center might become overcrowded with racks of servers consuming a lot of power and generating heat.

Figure 2:
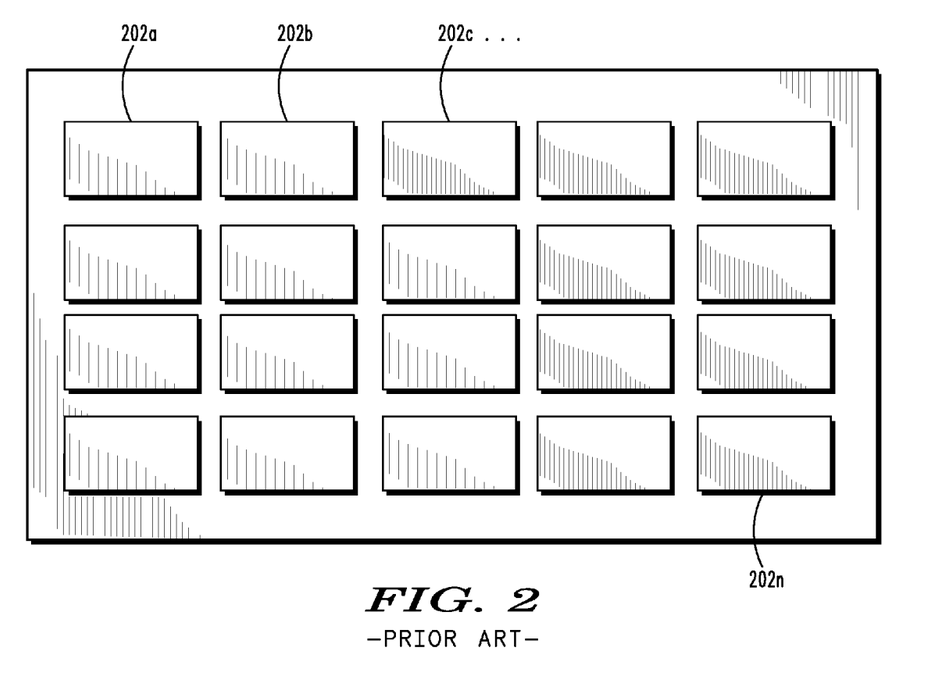
FIG. 2 is a schematic view of the functionality of a virtual server system.

One solution meant to address these issues is called "server virtualization." Virtualization uses specially designed software and allows an administrator to convert one physical server into multiple "virtual" machines. FIG. 2 provides a schematic view of the functionality of the server 104 of FIG. 1 as it provisions a plurality of virtual servers 202a-n, where "n" represents any number between 0 to infinity and "a-n", therefore, represents any number of items. Each virtual server 202a-n acts like a unique physical device, capable of running its own operating system (OS).

Server virtualization conserves space through consolidation. Instead of dedicating one machine to one task (application), several virtual machines can be consolidated into one physical server running multiple virtual environments. For companies that have hundreds or thousands of servers, the need for physical space can decrease significantly with the use of server virtualization. In addition to saving space, because each processor can now be used for more than one task, hardware can be better utilized.

Server virtualization, however, is not a perfect solution. That is because virtualization essentially divides the server's processing power up among the virtual servers. When the server's processing power can't meet application demands, everything slows down. Tasks that shouldn't take very long to complete might last hours. In other words, the benefits of server virtualization are limited by the physical server's processing power. Worse, it is possible that the system could crash if the server cannot meet processing demands. It is therefore unwise to overload a server's CPU by creating too many virtual servers on one physical machine because, the more virtual machines a physical server must support, the less processing power each individual virtual server can receive. In addition, there is a limited amount of disk space on physical servers. Too many virtual servers could impact the server's ability to store data.

One thing that has been consistent over the last 50 years is a dramatic increase in hardware technology each and every year. Those in the computer industry have happily watched the world follow "Moore's Law," which predicted a doubling of the number of transistors (an approximate measure of computer processing power) every 18 to 24 months. Although this law might not hold up forever, it is safe to expect tomorrow's hardware will offer recognizably significant performance advancements over those available today. Therefore, issues with server virtualization overwhelming the ability of server hardware can be addressed by simply replacing less-able components with superior ones.

Unfortunately, current server architecture utilizes computer "motherboards" that hold the multiple components necessary to run the server machine. For example, the INTEL XEON E5-2600 series CPU contains up to 8 cores plus HYPERTHREADING for a total of 16 threads per processor. This board is built on 32 nm technology and the overall die size is 416 mm. On this huge 416 mm die is 20 MB of L3 cache adding up to a transistor count of around 2.263 billion transistors.

When components of this board need to be upgraded, currently, the only solution is to remove and dispose of the entire expensive board, which is an unnecessary waste of pricey resources. For example, when a new processor is released, it is currently not possible to simply remove the old processors and insert the new ones into a motherboard on the data center floor. Similarly, it is not currently possible to simply add an additional processor or two to a motherboard in the data center. What data centers are lacking is an infrastructure that makes replacing old equipment and adopting new technology easy, quick, efficient, and inexpensive.

Therefore, a need exists to overcome the problems with the prior art as discussed above.

SUMMARY OF THE INVENTION

The invention provides a horizontally expandable computing system that overcomes the hereinafore-mentioned disadvantages of the heretofore-known devices and methods of this general type.

With the foregoing and other objects in view, there is provided, in accordance with the invention, a server including a primary memory board disposed primarily to support at least one primary memory; a secondary memory board disposed primarily to support at least one secondary memory; a processor board disposed primarily to support at least one processor; and an optical bus coupling the primary memory board, the secondary memory board, and the processor board to each other to communicatively couple the processor to the primary memory and the secondary memory.

In accordance with another feature of the present invention, the primary memory board, the secondary memory board, and the processor board are each disposed to physically couple to a respective backplane.

In accordance with a further feature of the present invention, the primary memory board is one of a plurality of primary memory boards coupled to a backplane, each of the plurality of primary memory boards holding an array of primary memories.

In accordance yet a further feature of the present invention, the primary memory board has more primary memories than processors.

In accordance with another feature of the present invention, the processor board has more processors than memories.

In accordance with yet another feature, an embodiment of the present invention includes a first rack supporting the primary memory board; a second rack supporting the secondary memory board; and a third rack supporting the processor board, wherein the first rack, the second rack, and the third rack are physically separate from each other.

In accordance with another feature of the present invention, the processor is operatively disposed to primarily utilize the secondary storage module on the secondary memory board for program and data storage.

In accordance with a further feature of the present invention, the processor is operatively disposed to primarily utilize the primary storage module on the primary memory board for RAM storage.

In accordance with yet another feature, an embodiment of the present invention includes a second processor board disposed primarily to support the processor; and the processor board physically separate from the second processor board and communicatively coupled thereto via the optical bus; wherein a BIOS distributes processing tasks between the processor board and the second processor board.

In accordance with a further feature, a BIOS controls data transmissions to the primary memory board, the secondary memory board, and the processor board over the optical bus.

In accordance with yet a further feature, the processor board is disposed to physically couple to a backplane, the backplane able to be safely placed into communicative coupling with a second backplane having a second processor board without a need to power down the second processor board.

In accordance with another feature, an embodiment of the present invention includes a horizontally expandable computing system with a first rack including a first backplane having one or more instances of a first single class of components; a second rack including a second backplane having one or more instances of a second single class of components; and an optical bus communicatively coupling the first backplane to the second backplane.

In accordance with yet another feature of the present invention, the first backplane substantially has only the first single class of components.

In accordance with a further feature of the present invention, the first single class of components are processors.

In accordance with another feature of the present invention, the processors are controlled only by a BIOS.

In accordance with a further feature of the present invention, the first single class of components are processors; the second single class of components are random access memories; the processors communicate with the random access memories over the optical bus; and the first rack is at least three feet away from the second rack.

In accordance with a further feature of the present invention, the first backplane having one or more instances of the first single class of components is able to be safely placed into communicative coupling with the second backplane having the one or more instances of the second single class of components without a need to power down the second single class of components.

In accordance with yet a further feature, an embodiment of the present invention also includes a controller allocating to a remote user resources from at least the first single class of components and the second single class of components to make available for use to the remote user the components of a standard server system.

In accordance with another feature, an embodiment of the present invention is a horizontally expandable computing system with a first rack including a first backplane having one or more instances of a first single class of components and devoid of any instances of a second single class of components; a second rack including a second backplane having one or more instances of the second single class of components and devoid of any instances of the first single class of components; and an optical bus communicatively coupling the first backplane to the second backplane.

In accordance with yet another feature of the present invention, allocation of resources, for a plurality of processing tasks, between at least the first single class of components and the second single class of components is performed by a BIOS.

Although the invention is illustrated and described herein as embodied in a horizontally expandable computing system, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient horizontally expandable server system that is virtually impervious to current limitations on communication transmission speed. Embodiments of the invention depart from the traditional server model, where all the components of the server computer communicate with each other through wired connections. In accordance with one embodiment of the present invention, the inventive server features separate and distinct functional boards to communicate to each other through an optical bus. For example, a first board would have only processors, a second board would have only primary memory, e.g., random access memory (RAM), and a third board would have only secondary memory, e.g., a hard drive. Each of the boards would plug into its own individual backplane port and the communication between the boards would be purely optical. As is known in the art, optical transmission has no real practical speed limit and can be as much as 300 Gb or more.

In addition, embodiments of the invention provide a logic circuit that distributes data efficiently to each processor based on one or more factors, such as the processor's current utilization by other processes. To achieve a certain level of efficiency, it may not use a traditional operating system like typical computing machines. Instead, the present invention can use a basic input output system (BIOS) that does all the heavy lifting by communicating with the processors and memories to distribute the processing work and data storage based on an efficiency model being carried out by the logic circuit. In addition to eliminating the overhead that comes with traditional operating systems, the use of BIOS instead of a traditional operating system eliminates many if not all security issues facing server systems today.

Advantageously, because the boards communicate through an optical bus, users can remove and replace boards and add additional boards without the need to shut down the entire system. In other words, unlike current servers, electrical pulses cannot accidentally be transmitted across an optical bus. This allows new components to be added to the server or for damaged or nonfunctional components to the replaced on-the-fly. Accordingly, the inventive server has virtual non-stop operation as well as almost limitless upgradeability of components without having to shut down the entire system.

As is known in the art, horizontal expansion of computer systems entails adding more machines into your pool of resources. On the other hand, vertical expansion of computer systems involves adding more power (e.g., CPU, RAM) to a single existing machine. Horizontal expansion is considered easier to expand dynamically by simply adding more machines into the existing pool. Vertical expansion is limited to the capacity of a single machine and expanding beyond that capacity often comes with downtime and an upper limit. The present invention is able to capture the best of both worlds, by combining the ease of vertical scaling (e.g., adding more CPU and memory), with the limitless capacity of horizontal scaling, i.e., adding more machines to the resource pool.

Figure 3:
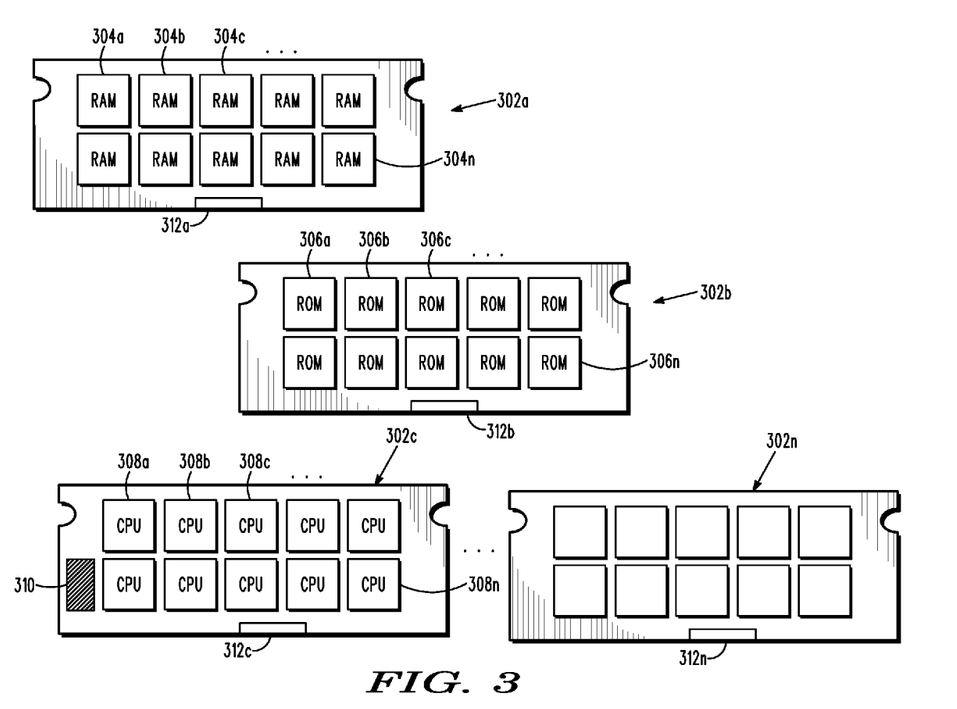
FIG. 3 is a schematic view of a horizontally expandable server system having a plurality of inventive server boards in accordance with an embodiment of the present invention.

Referring now to FIG. 3, one embodiment of the present invention is shown in a schematic view. FIG. 3 shows several advantageous features of the present invention, but, as will be described below, the invention can be provided in several shapes, sizes, combinations of features and components, and varying numbers and functions of the components. The first example of a horizontally expandable server system, as shown in FIG. 3, includes a plurality of server boards 302a-n. Traditional computer boards that exist today feature a balance of different components necessary to carry out the computing functions, for example, a processor that is located on the board very close to a RAM memory that is relatively close to a hard drive interface, communication interface, graphics processing unit (GPU), and others. As is known in the art, the processor is typically disposed physically close to the RAM memory so as to provide for higher speed wired memory access, as compared with a hard drive. The present invention departs from the traditional way of thinking. Instead, each of the plurality of server boards 302a-n includes one instance of a single class of components. The term "single class of components," as used herein, is intended to mean one type of computer component as differentiated from others that perform a different function. Therefore, a first class of components could be primary memories, which include storage systems which function at high-speed (i.e. RAM). A second class of components could be secondary memories, which provides program and data storage that is slow to access but offer higher memory capacity. Although both classes of components are memory, because they serve different functions, for purposes of the instant discussion, they are separate classes.

Figure 4:
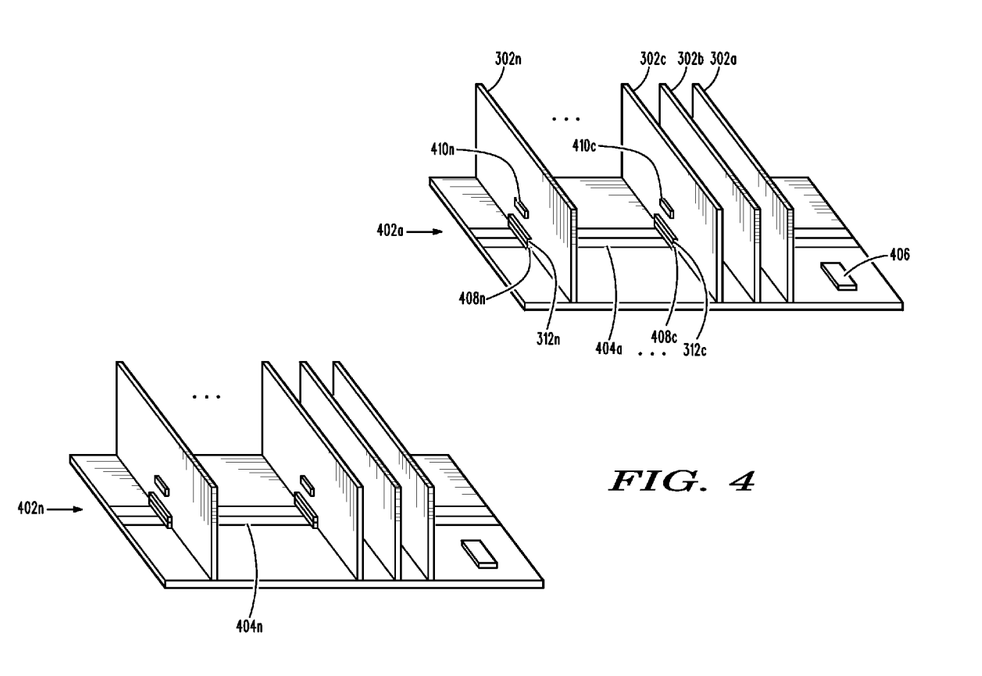
FIG. 4 is a downward-looking perspective view of server backplanes with a plurality of server boards connected thereto in accordance with an embodiment of the present invention.

Referring to FIG. 4, with reference to FIG. 3, each one of the plurality of server boards 302a-n plugs into a server backplane 402a-n, as shown in a downward-looking perspective view. The server backplanes 402a-n place the server boards 302a-n in communicative connection with each other via an optical bus 404a-n. An optical bus 404a communicatively couples server boards 302a-n in the same backplane 402a with each other. Likewise, the optical buses 404a-n optically communicatively couple backplanes 402a-n to each other.

Through utilization of the inventive system, a first server board 302a acts as a primary memory board. That is, the first server board 302a is disposed primarily to support an array of primary memories 304a-n, such as RAM, as just one example. Any other components that are included on the first server board are generally present simply to support the primary memories and are secondary to the purpose of the board which, again, is to provide one or more instances of primary memories to the server system. Similarly, a second server board 302b acts as a secondary memory board. That is, the second server board 302b is disposed primarily to support an array of secondary memories 306a-n, such as a hard drive or solid-state drive, for example. Any other components that are included on the second server board are generally present simply to support the secondary memories and are secondary to the purpose of the board which, again, is to provide one or more instances of secondary memories to the server system. To continue the example, the third server board 302c can include instances of a third single class of components, e.g., processors. That is, the third server board 302c is disposed primarily to support an array of processor modules 308a-n, such as a central processing unit (CPU) that carries out the instructions of a computer program by performing the basic arithmetic, logical, control and input/output (I/O) operations specified by the instructions. Any other components that are included on the third server board are generally present simply to support the processor modules and are secondary to the purpose of the board, which is to provide processing ability to the server system.

In one embodiment, one of the supporting components of the server boards 302a-n may be an optical connector 312a-n. The optical connector 312a-n on the server board 302a-n connects to a mating optical connector 408a-n on the optical backplane 402a-n for transmitting optical data communications between the server board 302a-n and the optical bus 404a-n. Unlike traditional electrical wired boards, the server boards 302a-n, in some embodiments of the present invention, do not include electromechanical connections at the base of the board that would traditionally connect to electromechanical slots disposed on a corresponding backplane. Instead, the server boards 302a-n may include one or more optical connectors 312a-n for the data transmissions via the optical bus 404a-n. In a further embodiment, a pair of copper conductors may be disposed each on an opposing side of the respective optical connector 312a-n for power. In yet a further embodiment, one of the pair of copper conductors is a 5 volt copper conductor and the other copper conductor is 12 volts. Known optical connectors may be used with the present invention, such as, for example, right angle optical coupling connectors.

In one embodiment, each of the plurality of server boards 302a-n includes an OE/EO module 410a-n that performs the optoelectrical coupling. The OE/EO module 410a-n converts protons to electrons and vice versa so that the optical data transmissions on the optical bus 404a-n can be received and understood by the electrical components (processor, memories, etc.) that are on the server boards 302a-n. Likewise, the OE/EO module 410a-n converts electrical data communications output by the electrical components on the boards 302a-n into optical data signals that can be transmitted across the high speed optical bus 404a-n. In one embodiment, the OE/EO module 410 can be implemented as separate OE and EO components. In another embodiment, the OE/EO module 410 can be implemented as a single unit. Known optoelectrical coupling components configured to convert data from electrons to protons and/or protons to electrons exist and may be used with embodiments of the present invention.

As can be seen in FIG. 4, the optical bus 404 couples the primary memory board 302a to both the secondary memory board 302b and the processor board 302c and, in doing so, communicatively couples the processors 308a-n to the primary memories 304a-n and the at least one secondary memories 306a-n.

Figure 5:
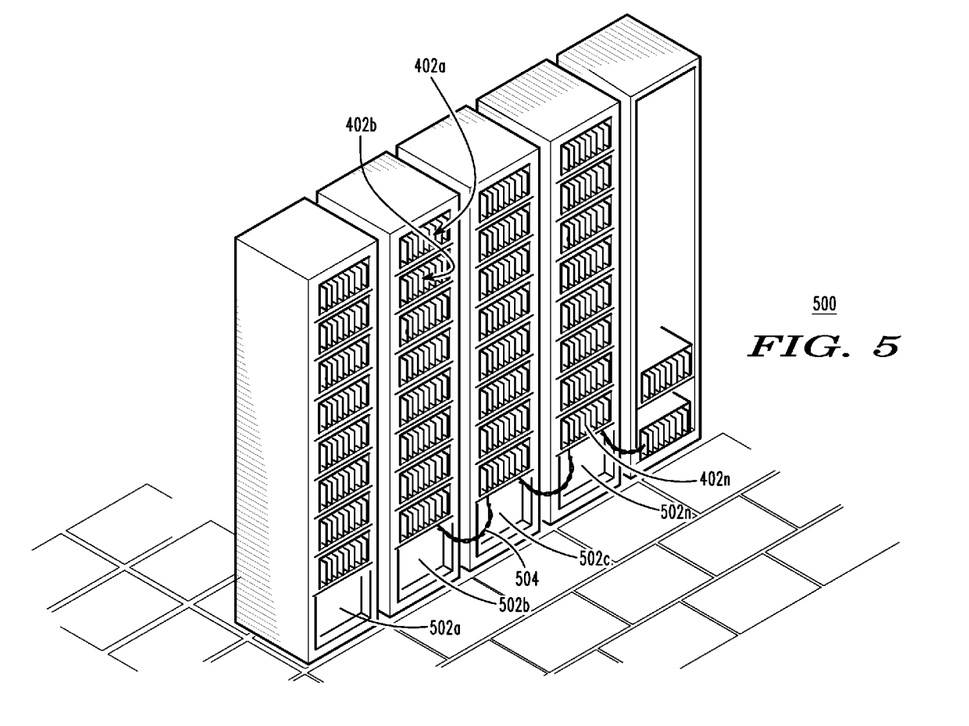
FIG. 5 is an exemplary server room with a plurality of server racks therein in accordance with an embodiment of the present invention.

FIG. 5 shows an exemplary server room 500 with a plurality of server racks 502a-n. Each of the racks 502a-n supports a plurality of backplanes 402. It is possible for the server room 500 to be organized so that each server rack 502a-n is a separate class of components. For example, server rack 502a supports one or more backplanes 402a-n. In this example, the one or more backplanes 402a-n includes the plurality of primary memories 304a-n shown in FIG. 3. Server rack 502b supports one or more backplanes 402a-n. In this example, the one or more backplanes 402a-n held within server rack 502b include the secondary memories 306a-n shown in FIG. 3. Finishing the example, server rack 502c also supports one or more backplanes 402a-n. In this example, the one or more backplanes 402a-n held within server rack 502c include the processor modules 308a-n shown in FIG. 3. The present invention then places the plurality of racks 502a-n and coupling communication through an optical bus 504. With traditional wired connections, processor modules 308a-n could not effectively utilize either of the memories 302a-n, 304a-n due to the magnetic radiation field that would be produced as data was moved along the communication path. With an optical bus however, the processors 308 can communicate with and utilize the primary and secondary memories at will without concern for causing interference with other components. In one embodiment, each of the plurality of server racks 502a-n are within the server room 500 so as to be within at least three (3) feet from one another. In another embodiment, each of the backplanes 402a-n may be communicatively coupled to one another with an optical cable so that optical data communications can be transmitted throughout all of the server racks 502a-n. In a further embodiment, the optical cable is connected to the optical bus 404a-n of each of the backplanes 402a-n within the server racks 502a-n to form the optical bus 504.

The inventive structure illustrated in FIGS. 1-5 provides a tremendous advantage over the prior art in terms of expandability and replace-ability of the various components within the system. Because the components are discreetly separated from one another, when the system requires, for example, word processing ability, a new board with any number of additional processors can simply be added to the system virtually instantly. In fact, because communications take place optically, the system can continue running as new processors are added. Likewise, if the system needs more memory, a new board full of memories can simply be slid into one of the backplanes. Addition or replacement of components while the server is running is referred to herein as a "hot swap." This provides for a server system with virtually non-stop operation. Because any board with a component that fails can be hot swapped without having to shut down the system as a whole, there is provided virtually non-stop operation as well as almost limitless upgradeability.

In one embodiment, if a memory board fails, the system can simply copy the data stored on the memory board to another memory board and reroute traffic to the other memory board so that the failing memory board can be hot swapped out. Advantageously, because the processors are on a separate processor board, the processor would not have to be shut down in order to upgrade or swap out the memory, as with prior art boards that include both the processor and memory on a single board. In addition, use of a high speed optical bus allows for placement of memory and a corresponding processor on completely separate boards without sacrificing communication speeds or resulting in RF interference, which would be the result for a wired communications bus. As is known in the art, relatively long electrical traces on a PCB can act like an antenna and cause interference with other neighboring components.

Returning briefly to FIG. 4, it can be seen that the backplane 402a includes an additional optional component 406. The component 406, in one embodiment, includes resource allocation logic that assists in allocating system resources. For example, the resource allocation logic may be implemented in, for example, firmware or other logic circuitry 406 that monitors the usage of the system's processors 308a-n and allocates tasks to those processors based on their unused availability. This eliminates overutilization of certain processors and underutilization of others. This utilization technique applies to memory and other system components as well. In one embodiment, the logic circuitry 406 can be implemented in an EEPROM or another non-transitory memory. In another embodiment, the logic circuitry 406 may only be reprogrammed using specialized equipment that must be connected to the logic circuitry 406 on site.

It is possible that the resource allocation logic within the logic circuitry 406 can identify damaged or underperforming components of each of the boards and can shift tasks normally assigned to those components to different components. For example, if one bank of processors was not performing up to expected specifications, the logic circuitry 406 can route further tasks to other processors and skip those that are identified as underperforming. There are many methods known in the art for monitoring and determining the performance of known components.

In one embodiment, the logic circuitry 406 operates only through a BIOS and does not utilize a standard operating system. By using only a BIOS, the logic circuitry 406 can run "light" and is not otherwise tasked with the usual overhead of an operating system. Furthermore, most operating systems are vulnerable to security attacks, viruses, and bugs. Because the BIOS is a closed environment and generally specified by the manufacturer only, it does not suffer from the aforementioned disadvantages.

In accordance with one embodiment of the present invention, the BIOS can be considered an advanced BIOS operably configured to monitor and control all of the server system's hardware components and allocate hardware resources (processor, memories, etc.) according to load balancing algorithms. Whereas a standard operating system operates on a higher level computer language to allocate resources to processing tasks, the advanced BIOS may be written in assembly language, which, as is known in the art, is closer to machine language. This allows the advanced BIOS to communicate between the hardware and the virtual machines more quickly than a standard operating system in order to perform its job as "traffic cop" for all the hardware resources and virtual machines that may be running on the server system.

In one embodiment, the present invention features an interface that allows users to specify the number of resources they desire. Based on the requests from the user, the logic circuitry 406 can reserve certain processors for the user and shift other processing tasks to other processors in the system. For example, a user may be allocated a virtual machine on the server system 500. That virtual machine might allow that user access to two processors under normal conditions. If the user suddenly finds a need for increased processing power, she can simply requests more resources from the system 500 and additional processors will be at her disposal. For example, the logic circuitry 406 could reserve, for example, one-hundred (100) processors that are only utilized by the requesting user for a specific period of time. Fortunately, the inventive system 500 is dynamic and can shift all other processes to whatever processors remain available in the system 500. As another example, the logic circuitry 406 can also balance traffic to the memories 304a-n, 306a-n.

Returning briefly to FIG. 3, a buffer memory 310 is shown on the board 302c. In practice, the processors 308a-n can output data faster than a memory can react. The buffer memory 310 buffers communications from the one or more processors 308a-n and helps to ensure accurate data is transmitted to the remote memories over the optical bus. In one embodiment, the buffer memory 310 is a single buffer memory. In another embodiment, the buffer memory 310 can be multiple separate memories on the board 302c, where every processor 308a-n will have its own corresponding buffer memory. In short, the buffer memories 310 take up the slack in the latency of the transmission from processor to memory.

A novel and efficient horizontally expandable server system that is virtually impervious to current limitations on communication transmission speed has been disclosed that depart from the traditional server model, where all the components of the server computer communicate with each other through wired connections. The inventive server features separate and distinct functional boards to communicate to each other through an optical bus. The present invention can use a BIOS that communicates with the processors and memories to distribute the processing work and data storage based on an efficiency model. This eliminates the overhead that comes with traditional operating systems and eliminates many if not all security issues facing server systems today. In addition, unlike current servers, electrical pulses cannot accidentally be transmitted across an optical bus, therefore new components can be added to the server or damaged or nonfunctional components may be replaced on-the-fly, without having to shut the entire system down.

What is claimed is:

1. A server comprising:
   a primary memory board disposed primarily to support at least one primary memory;
   a secondary memory board disposed primarily to support at least one secondary memory;
   a processor board disposed primarily to support at least one processor;
   an optical bus coupling the primary memory board, the secondary memory board, and the processor board to each other to communicatively couple the at least one processor to the at least one primary memory and the at least one secondary memory, each of the at least one primary memory, the at least one secondary memory, and the at least one processor only accessible as a shared resource within the server; and
   a BIOS configured to allocate the at least one primary memory on the primary memory board, the at least one secondary memory on the secondary memory board, and the at least one processor on the processor board to processing tasks running on the server.

2. The server of claim 1, wherein:
   the primary memory board, the secondary memory board, and the processor board are each disposed to physically couple to a respective optical backplane.

3. The server of claim 1, wherein:
   the primary memory board is one of a plurality of primary memory boards coupled to a backplane, each of the plurality of primary memory boards holding an array of primary memories.

4. The server of claim 1, wherein:
   the primary memory board has more primary memories than processors.

5. The server of claim 1, wherein:
   the processor board has more processors than memories.

6. The server of claim 1, further comprising:
   a first rack supporting the primary memory board;
   a second rack supporting the secondary memory board; and
   a third rack supporting the processor board,
   wherein the first rack, the second rack, and the third rack are physically separate from each other.

7. The server of claim 1, wherein:
   the at least one processor is operatively disposed to primarily utilize the at least one secondary memory on the secondary memory board for program and data storage.

8. The server of claim 1, wherein:
   the at least one processor is operatively disposed to primarily utilize the at least one primary memory on the primary memory board for RAM storage.

9. The server of claim 1, further comprising:
   a second processor board disposed primarily to support at least one processor; and
   the processor board physically separate from the second processor board and communicatively coupled thereto via the optical bus; and
   wherein the BIOS is configured to distribute processing tasks between the processor board and the second processor board.

10. The server of claim 1, wherein:
    the processor board is disposed to physically couple to a backplane, the backplane able to be safely placed into communicative coupling with a second backplane having a second processor board without a need to power down the second processor board.

11. The server of claim 1, wherein:
    each of the primary memory board, the secondary memory board, and the processor board is only accessible as a shared resource within the server.

12. A horizontally expandable computing system comprising:
    a first rack including:
       a first backplane having one or more instances of a first single class of components;
    a second rack including:
       a second backplane having one or more instances of a second single class of components; and
    an optical bus communicatively coupling the first backplane to the second backplane, wherein:
       the first backplane substantially has only the first single class of components;
       the first single class of components are processors; and
       allocation of the processors are controlled only by a BIOS.

13. The horizontally expandable computing system according to claim 12, wherein:
    the second single class of components are random access memories; and
    the processors communicate with the random access memories over the optical bus.

14. The horizontally expandable computing system according to claim 12, wherein:
    the first backplane having one or more instances of the first single class of components is able to be safely placed into communicative coupling with the second backplane having the one or more instances of the second single class of components without a need to power down the second single class of components.

15. The horizontally expandable computing system according to claim 12, wherein:
    the BIOS allocates to a remote user resources from at least the first single class of components and the second single class of components to make available for use to the remote user.

16. A horizontally expandable computing system comprising:
- a first rack including:
  - a first backplane having one or more instances of a first single class of components;
- a second rack including:
  - a second backplane having one or more instances of the second single class of components; and
- an optical bus communicatively coupling the first backplane to the second backplane, wherein allocation of the first single class of components and the second single class of components between a plurality of processing tasks is performed by a BIOS.

17. The horizontally expandable computing system in accordance with claim 16, wherein:
- the BIOS allocates to a remote user resources from at least the first single class of components and the second single class of components to make available for use to the remote user as a result of the remote user's request to be allocated additional hardware resources.

18. The horizontally expandable computing system in accordance with claim 16, wherein:
- the first single class of components are processors; and
- the second single class of components are random access memories.

19. A server comprising:
- a primary memory board disposed primarily to support at least one primary memory;
- a secondary memory board disposed primarily to support at least one secondary memory;
- a processor board disposed primarily to support at least one processor;
- an optical bus coupling the primary memory board, the secondary memory board, and the processor board to each other to communicatively couple the at least one processor to the at least one primary memory and the at least one secondary memory;
- wherein:
  - each of the at least one primary memory, the at least one secondary memory, and the at least one processor is only accessible as a shared resource within the server; and
  - the processor board is disposed to physically couple to a backplane, the backplane able to be safely placed into communicative coupling with a second backplane having a second processor board without a need to power down the second processor board.

20. The server of claim 19, wherein:
- allocation of each of the at least one primary memory, the at least one secondary memory, and the at least one processor as a shared resource within the server is performed by a BIOS.

* * * * *